United States Patent
Cross

[15] 3,649,072
[45] Mar. 14, 1972

[54] PICKUP BED COVER

[72] Inventor: Floyd R. Cross, P.O. Box 464, La Veta, Colo. 81055

[22] Filed: Oct. 22, 1970

[21] Appl. No.: 83,065

[52] U.S. Cl. ........................................................296/137 B
[51] Int. Cl. ..................................................................B60j 7/10
[58] Field of Search.............296/137 B, 137 R, 100; 160/32, 160/33

[56] References Cited

UNITED STATES PATENTS

| | | |
|---|---|---|
| 2,853,340 | 9/1958 | Hershberger.......................296/137 B |
| 3,342,523 | 9/1967 | Lutgen..................................296/100 |
| 2,672,192 | 3/1954 | Goldner..................................160/32 |

Primary Examiner—Benjamin Hersh
Assistant Examiner—Robert R. Song
Attorney—Anderson, Spangler & Wymore

[57] ABSTRACT

This invention relates to a slidable telescopic cover for the bed of pickup trucks and the like characterized by a pair of opposed parallel inwardly facing tracks that retain the opposite extremities of a series of transversely extending interlocking rectangular slat-forming panels that are movable forward longitudinally from an essentially planar cover-forming relation into a stacked relation as they emerge from the front ends of the tracks into a roofed housing therefor.

10 Claims, 5 Drawing Figures

Patented March 14, 1972 3,649,072

INVENTOR
FLOYD R. CROSS
BY
Anderson, Spangler & Wymore
ATTORNEY

PICKUP BED COVER

Covers for the open beds of pickup trucks, while providing the obviously needed weather protection for goods carried therein, are seldom used because they are both inconvenient and, to some extent at least, a source of trouble rather than the looked-for solution to a problem. By and large, the prior art pickup bed covers consist of nothing more than a canvas sheet bordered by snaps or some other type of two-part fastener by means of which it can be removably attached to the vehicle. As is the case with a convertible top, it is rapidly and easily removed, but when the time comes to put it back on again, the procedure becomes a laborious and time-consuming one often requiring more than one person due to the frequent necessity for having to stretch the canvas taut in order to complete the connection. The net result is, of course, that the cover is left unfastened most of the time, especially when frequent access to the bed is needed as in the case of a delivery truck or the like. When left unfastened, the cover flaps in the wind, is noisy, becomes torn, and the metal parts scratch the painted surfaces as they strike them.

Furthermore, instead of providing weather protection for the goods stored therebeneath, canvas covers of this type more often than not sag and form reservoirs that collect rain and snow in pockets or puddles that present a more formidable threat to the goods than if they had been left exposed to the elements in the first place. Removing a canvas cover laden down by snow or rain is no easy task in itself, yet alone doing so while keeping the bed along with any goods carried therein.

Canvas covers, of course, provide at most a degree of weather protection but no theft protection other than, perhaps, concealing the fact that goods are being carried in the bed. While it would be a simple matter to provide some means for securely locking the hem of the cover to the rim of the bed, it would be of no real protection to do so when a penknife will easily cut through the canvas anywhere one wishes to gain access to whatever is concealed therebeneath.

A metal cover in the form of slats hingedly interconnected in the manner of an old rolltop desk presents one possible solution to the problem of theft protection as it is easily locked; however, the construction is such that it becomes extremely difficult, if not virtually impossible, to make weather-tight due to the number and length of hinged joints. As a result, a unit of this type is most often used as a door where it will shed most of the moisture. Also, these units are both complicated and expensive thus limiting their use from a practical standpoint to large trucks where the value of the cargo justifies such protective measures.

It has now been found in accordance with the teaching of the instant invention that a simple and relatively inexpensive rigid metal or plastic cover for pickup truck beds can be fabricated that provides both excellent theft protection and reasonably effective weather protection. The unit eliminates most of the difficulties ordinarily associated with custom manufacture and installation because the length of the cover is a function of the number of slats used and, with the slats being entirely separate, though interlockable elements, it becomes merely a matter of choosing the appropriate number. The slats can be cut to the proper width and the tracks to the right length with simple power or even hand tools of the type owned by most handymen. The same is true of mounting the rails and storage compartment as these elements are merely fastened to the truck body with small screw fasteners or the like.

Once installed, the cover enhances the appearance of the truck as a whole and provides an essentially theft-proof canopy protecting the contents of the bed. It slides open and closed very easily and quickly thus lessening the temptation to leave it open between deliveries. Even when left partially open, the exposed slats remain securely interlocked and confined between the rails so that they connect rattle or loosen.

It is, therefore, the principal object of the present invention to provide a novel and improved rigid protective cover for pickup truck beds and the like.

A second objective is the provision of a unit of the type disclosed and claimed herein in which the slats interlock to form an essentially weather-tight canopy over the bed.

Another object of the invention is to provide a unit of the type aforementioned that is readily adaptable to various types and sizes of truck beds with simple home workshop tools.

Still another objective is the provision of a protective cover formed of rigid interlocking slats that telescope one beneath another into stacked relation for storage.

An additional objective of the invention is the provision of a collapsible door-forming assembly suitable for use in covering almost any rectangular access opening.

Further objects of the invention are to provide a foldable access cover that is relatively inexpensive, lightweight yet rugged, simple to install, versatile, easy to operate, strong, safe, easy to repair and decorative in appearance.

Other objects will be in part apparent and in part pointed out specifically hereinafter in connection with the description of the drawings that follows, and in which.

Figure 1:
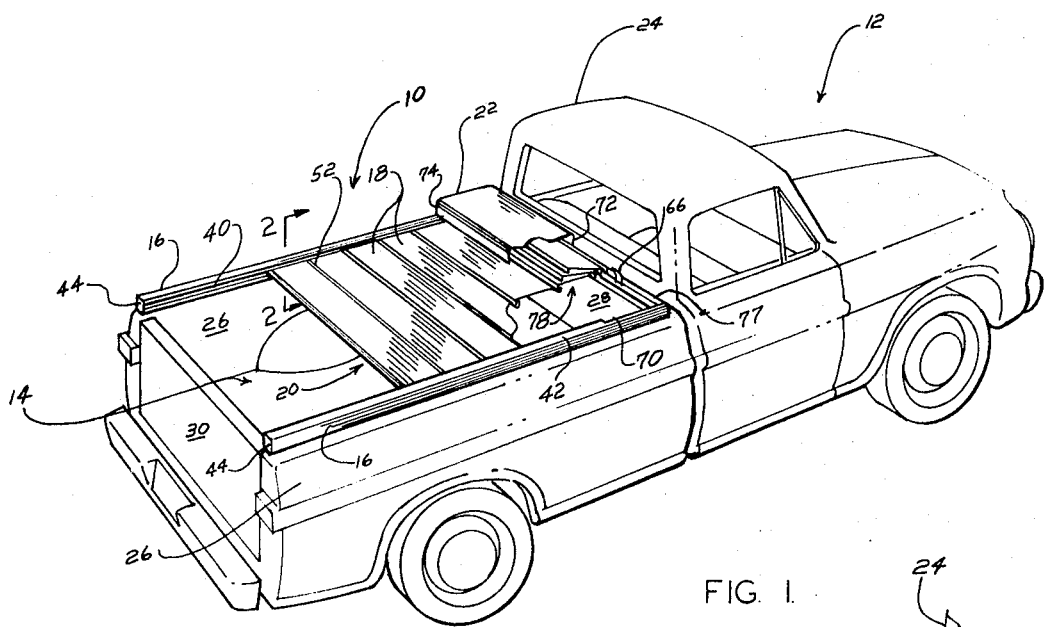
FIG. 1 is a perspective view looking from a position above and to the right rear of a pickup truck, the bed of which is equipped with the protective cover of the present invention.
Figure 2:
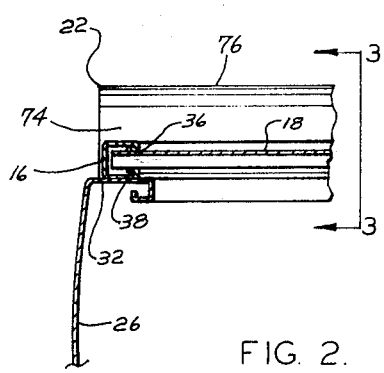
FIG. 2 is a fragmentary section to an enlarged scale taken along line 2—2 of FIG. 1.

Referring next to the drawings for a detailed description of the present invention and, initially, to FIG. 1 for this purpose, reference numeral 10 has been selected to broadly designate the truck bed cover in its entirety while number 12 refers to the truck and 14 to the open-topped bed thereof. While the unit finds its primary utility in the environment in which it has been illustrated, namely, as a rigid telescoping cover for truck beds and the like, its construction is such that it can be used without modification as an openable covering for any rectangular recess opening such as, for example, a door of some type. Thus, as the description proceeds, it is important to bear in mind that the trucks 16 can be mounted in fixed-spaced parallel relation on opposite sides or even the top and bottom of any rectangular access opening so as to guide the interlocking slat-forming segments 18 of the canopy 20 for movement between its closed or extended position and one of its open positions wherein two or more of the slats are telescoped into stacked relation one atop the other inside housing 22.

In the particular form illustrated, truck 12 is an ordinary so-called "pickup" having the bed 14 located directly behind the cab 24 containing the driving compartment. The bed 14 comprises an open-topped rectangular boxlike structure having upstanding side walls 26, a front wall 28 and a tail gate 30 at the rear end thereof. As in generally the case, the side walls 26 include horizontally disposed essentially planar ledges 32 along the top thereof that provide ideal structures upon which to fasten the tracks 16 in fixed spaced parallel relation to one another extending from the tail gate forwardly to the front wall 28 where the housing 22 is located and fastened permanently in place. The tracks 16 can also be fastened to vertical stakes which can, in turn, be slipped down into the stake holes generally provided in top edges of the side walls. Such a mounting permits complete removal of the cover without the use of any tools.

Figure 3:
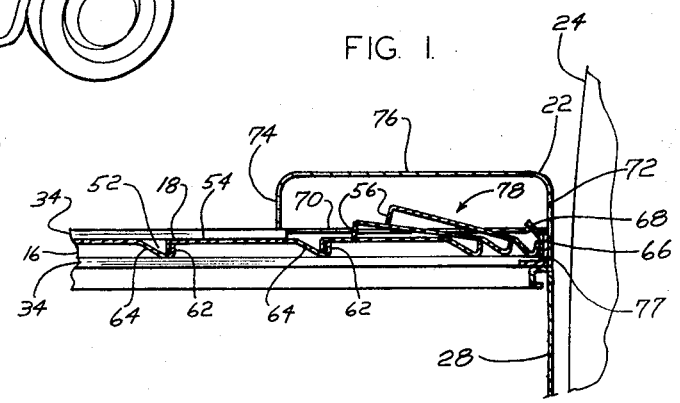
FIG. 3 is a fragmentary longitudinal section locking in the direction of the arrows 3—3 in FIG. 2 and to the same scale as the latter Figure.

Referring next to all of the Figures of the drawing, it will be seen that the tracks 16 comprise hollow box-beams having a generally square cross section and with one side slit longitudinally along its midline to free flanges 34, the adjacent margins of which are inturned to define upper and lower rails 36 and 38 within the track bordering longitudinal slot 40 therebetween. These slots 40 open inwardly toward one another in opposed relation so as to slidably receive the interlocking slats 18 extending transversely therebetween. The portion of each rail covered by housing 22 has the top web 42 and upper flange 34 connected thereto removed as shown in FIGS. 1 and 3 so that the slats can emerge therefrom and assume a stacked relation. Conversely, the rear extremities of both tracks are closed by end plates 44 (FIG. 1) that form stops preventing the removal of the slats.

Figure 4:
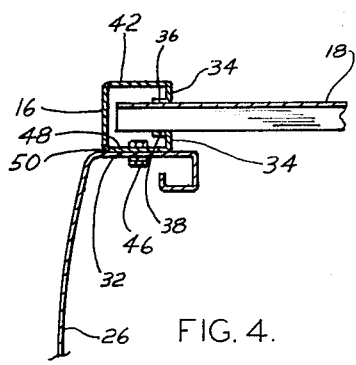
FIG. 4 is a further enlarged fragmentary transverse section showing the tracks fastened to the side walls of the pickup body and the slats slidably confined within the tracks; and, FIG. 5 is a fragmentary longitudinal section to the same scale as FIG. 4 showing the manner in which the slats interlock with one another and are confined in extended position within the tracks.

In FIG. 4 it will be seen that the tracks have been shown attached to the ledges 32 atop the side walls 26 of the bed 14 by means of ordinary screw fasteners 46 passing down through openings in the bottom web 48. Also shown in FIG. 4 is a drain opening 50, at least one of which is preferably located in the lower outside corner of each track. As will be seen presently, a transversely extending, upwardly opening trough 52 is provided along the leading edge of each slat 18 which functions to drain all the water off the top of the canopy into one of the tracks where it is discharged over the side of the bed through one of the aforementioned drain opening 50.

Figure 5:
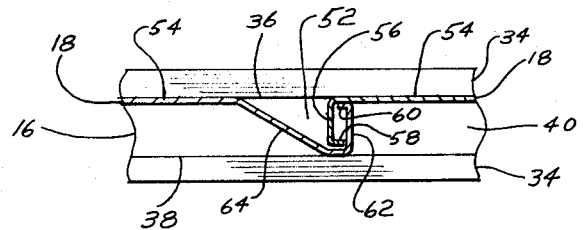

Next, with particular reference to FIGS. 3 and 5, it will be seen that all of the slat-forming segments 18 are substantially identical and each comprises an essentially planar midsection 54 bordered along the trailing edge thereof by a downturned flange 56 having an inturned lip 58 projecting forwardly from the lower margin thereof. The aforementioned lip 58 defines a hook positioned and adapted to engage beneath a second inturned lip 60 projecting rearwardly from the top margin of an upturned flange 62 on the leading edge of the adjacent slat to the rear thereof when said slats are held in essentially planar full extended position between the rails 36 and 38. While these interengageable lips 58 and 60 are not essential to the normal operation of the unit in any respect, they do provide an additional measure of theft protection because, without them or some equivalent opposed stop arrangement, it might be possible to spring down the leading edge of one of the slats at a point intermediate the ends thereof so as to create a gap or opening beneath the slat ahead of sufficient size to pass the hand and permit the unauthorized removal of goods in the truck bed while the canopy remained closed.

Sill with reference to FIGS. 3 and 5, it will be seen that a downwardly and forwardly inclined cam surface 64 joins the front edge of the midsection 54 to the base of upturned flange 62 while cooperating with the latter to define the previously mentioned drain trough 52.

The height of upturned flange 62 on the leading edge of each slat is selected such that it will engage the underside of the midsection of the slat ahead thereof and hold same in tight slidable engagement with upper rail 36 of the track. In other words, the combined height of flange 62 and the thickness of the midsection 54 is substantially equivalent to the width of slat 40. Similarly, the height of the downturned flange 56 is substantially equal to the depth of the trough 52 of the following slat into which it projects although neither of the aforementioned relationships is critical as will appear presently.

Now, with the canopy fully, or at least partially closed as shown in FIGS. 1 and 3, it is opened by pushing forward on the trailing edge of the rearmost slat 18. As this occurs, the downturned flange 56 on the slat second from the rear will begin to ride up on inclined cam surface 64 until it becomes tightly wedged between the latter surface and the upper rail 36 of the track 16; whereupon, both the rear slat and the one second from the rear will start to move forward together. One by one, each slat will be picked up in turn until finally the front one is forced up against a pair of transversely spaced stop-forming shoes 66 located at the front of the canopy inside housing 22. Now, since the top webs 42 of both tracks have been removed inside the housing, the downturned flange 56 at the trailing edge of the lead slat is not restricted by upper rail 36 and is, therefore, free to ride up on the inclined can surface of the second slat from the front and on rearwardly onto the midsection thereof as is clearly revealed in FIG. 3. This movement of the second slat from the front into position beneath the front one will continue until the upturned flange of the second one strikes the trailing edge of the cam surface from the underside (see FIG. 3), whereupon, further relative movement therebetween ceases and the third slat from the front begins moving forward under the second. Once the forwardly moving chain of slats has been established as aforementioned, the stacking process continues so as to build the stack from the bottom up one by one starting with the front slat until, eventually, all the slats are stacked one atop the other underneath housing 22. The stop-forming shoes 66 carry rearwardly extending flanges 68 that overhang the leading edge of the front slat and provide the stops that prevent it from lifting off of the lower rail 38 any appreciable distance.

The length of the notch 70 formed by the removal of the top web 42 of the tracks is such as to accommodate all of the slats in stacked relation, the trailing edge of each being lifted through said notch at a point somewhat farther back than the preceding one. Likewise, the longitudinal distance separating the front and rear walls 72 and 74 of the housing is sufficient to accommodate the maximum sized stack of slats as is true of the space left beneath the roof 76 thereof. In the particular form shown, a transverse member 77 extends across the front of the cover between the tracks and provides the frame element to which the front wall 72 of the housing and the stop-forming shoes 66 are attached.

To close the canopy, the procedure is reversed by pulling rather than pushing on the trailing edge of the rearmost slat. As it is withdrawn from the bottom of the stack 78, the downturned flange 56 on the trailing edge of the second slat from the rear will ride down the inclined cam surface 64 into the bottom of the trough 52 where it will hook onto the stack. Since all of the slats ahead of the one being drawn rearwardly off the bottom of the stack rest atop thereof, there appears to be no necessity of providing a cam surface at the front end of the upper rail 36 adapted to guide the trailing edge of said slat into the slot 40. One by one the slats will be pulled off the bottom of the stack working from the rear toward the front until the stack is completely depleted. The end plates at the rear ends of the tracks prevent the leading edge of the canopy from moving out rearwardly from underneath the housing. Note also that full-sized slats can be used regardless of the length of the bed because it makes no difference whether the leading edge of the front slat is snug up against the front wall of the housing or not when the canopy is closed because it will be pushed forward into position against the stops just as soon as the canopy is moved toward its open position. It should also be apparent that the slats forming the canopy can be separated from one another as they are pulled out from the stack in the housing. By utilizing this separation capability a desired number of slats can be pulled from the housing and slid to the rear of the bed thereby leaving the front portion open to receive a load while covering the rear.

From the foregoing description, it should be apparent why, as previously mentioned, the height of flanges 56 and 62 is not especially critical. In closing the canopy, the trailing edge of the lead slat will drop down so that the downturned flange hooks behind the upturned flange 56 of the following slat even though they are considerably shorter than illustrated. Conversely, in opening the canopy, a shorter downturned flange means only that a greater amount of relative longitudinal movement between adjacent slats becomes necessary before such flange 62 becomes wedged between the cam surface 64 and the upper rail 36 so that the relative motion stops and these slats commence moving forwardly together as a unit. On the other hand, it should be obvious that with the slats securely held within the slot 40 against any relative up and down movement, there will be little if any rattling and substantially all lost motion will be eliminated from the canopy-opening operation.

No attempt has been made to illustrate the various locking means that could be used to releasably latch the rear slat to the track or tail gate in closed position because such are well within the skill of the art and, for this reason, are not particularly novel or patentable. The slats must, of necessity, be rigid but they could easily be moulded from some high impact type of plastic material in place of being formed from metal.

What is claimed is:

1. The telescopable cover for horizontally disposed generally rectangular access openings and the like which comprises: a pair of rigid elongate generally channel-shaped tracks mountable on opposite sides of the access opening in transversely spaced parallel relation with the channels therein opening toward one another, each of said tracks including upper and lower rail-forming surfaces separated by a longitudinally extending slot, a length of the upper rail at the front end of each track being removed to define a notch; a plurality of essentially planar transversely elongate rectangular slat-forming panels bridging the space between the tracks with the opposite ends thereof located within the slots for longitudinal slidable movement along the lower rails, the trailing edge of each panel having a downturned flange, the leading edge of each panel including a downwardly and forwardly inclined cam surface terminating in an upturned flange cooperating therewith to define an upwardly opening transverse trough, the downturned flange of each lead panel hooking behind the upturned flange of the adjacent following panel to define an interlocking chain thereof, the cam surface of each following panel being adapted, upon forward longitudinal movement thereof relative to the adjacent lead panel to cooperate with the downturned flange of the latter and wedge same against the upper rail while confined therebeneath so that said panels move ahead together as a unit, and said cam surface and adjacent downturned flange also cooperating with one another upon forward relative movement underneath the notches in the tracks to lift said lead panel into a superimposed stacked relation atop said following panel, the trailing edge of the cam surface on the underside of each lead panel defining a stop positioned to engage the upturned flange on the leading edge of the adjacent following panel when moving into stacked relation thereabove and adapted to terminate further forward relative longitudinal movement therebetween, and said downturned flange of each lead panel being adapted to slide forwardly down the cam surface into interlocked engagement behind the upturned flange of the adjacent following panel upon rearward relative longitudinal movement of the latter, said interlocking flanges cooperating to form the panels into a chain thereof positioned to re-enter the slot; and, stop means located in the path of the leading edge of the lead panel at the front end of the access opening adapted to engage the latter and limit the forward movement thereof.

2. The telescopable cover as set forth in claim 1 in which: inturned lips are provided along the free edges of both the upturned and downturned flanges, adjacent pairs of said lips lying one above the other in opposed face-to-face position when the panels are in extended relation to one another, and said lips of each pair cooperating with one another to define stops adapted to interengage upon relative vertical movement of adjacent panels in a direction to open a gap therebetween.

3. The telescopable cover as set forth in claim 1 in which: a housing extends transversely across the front of the tracks sized and adapted to receive all of the panels in stacked relation therebeneath.

4. The telescopable cover as set forth in claim 1 in which: stop-forming means are located at the rear of the access opening in the path of the trailing edge of the rearmost panel, said means being positioned and adapted to prevent removal of the panels from the slots in the tracks.

5. The telescopable cover as set forth in claim 1 in which: the tracks have an essentially rectangular cross section with the slot extending longitudinally along substantially the midline of one wall thereof so as to separate same into opposed coplanar upper and lower flanges; and, in which the upper and lower rail-forming surfaces comprise inturned lips on the adjacent free edges of said upper and lower flanges.

6. The telescopable cover as set forth in claim 1 in which: the cam surface is separated from the downturned flange by an essentially planar section extending therebetween in parallel relation to the rail-forming surfaces.

7. The telescopable cover as set forth in claim 1 in which: the uprutned flange of each following panel is of a height adapted to hold the upper surface of the lead panel immediately ahead thereof in sliding contact with the upper rail-forming surface.

8. The telescopable cover as set forth in claim 1 in which: at least one drain opening is provided in the lower outside corner of each track adapted to drain the latter of water fed therein by the upwardly forcing panel troughs.

9. The telescopable cover as set forth in claim 1 in which: the depth of the downturned flange and the slope of the cam surface is selected such that only minimal relative forward longitudinal movement between adjacent panels confined between the rail-forming surfaces can take place before said panels interlock and move forward as a unit.

10. The telescopable cover as set forth in claim 1 in which: the stop-forming means at the front of the access opening includes a rearwardly extending portion overhanging the leading edge of the front panel when abutted thereagainst, said overhanging portion being positioned and adapted to prevent said leading edge from lifting any appreciable distance off the lower rail-forming surface.

* * * * *